(12) United States Patent
Qiu et al.

(10) Patent No.: US 7,868,600 B2
(45) Date of Patent: Jan. 11, 2011

(54) ADAPTIVE PWM PULSE POSITIONING FOR FAST TRANSIENT RESPONSE

(75) Inventors: Weihong Qiu, San Jose, CA (US); Robert H. Isham, Flemington, NJ (US); Zhixiang Liang, Portland, OR (US); Thomas Szepesi, Saratoga, CA (US)

(73) Assignee: Intersil Americas Inc., Milpitas, CA (US)

( * ) Notice: Subject to any disclaimer, the term of this patent is extended or adjusted under 35 U.S.C. 154(b) by 233 days.

(21) Appl. No.: 12/273,441

(22) Filed: Nov. 18, 2008

(65) Prior Publication Data

US 2009/0072807 A1  Mar. 19, 2009

Related U.S. Application Data (63) Continuation-in-part of application No. 11/383,878, filed on May 17, 2006, now Pat. No. 7,453,246.

(60) Provisional application No. 60/737,523, filed on Nov. 16, 2005, provisional application No. 60/774,459, filed on Feb. 17, 2006.

(51) Int. Cl.
*G05F 1/56* (2006.01)

(52) U.S. Cl. .......................... 323/282; 327/175; 363/41

(58) Field of Classification Search ................ 323/282, 323/283, 288; 327/175; 363/41
See application file for complete search history.

(56) References Cited

U.S. PATENT DOCUMENTS

| | | | |
|---|---|---|---|
| 3,879,647 A | 4/1975 | Hamilton et al. | |
| 4,468,569 A | 8/1984 | Norris | |
| 5,742,151 A | 4/1998 | Hwang | |
| 6,836,103 B2 | 12/2004 | Brooks et al. | |
| 7,109,692 B1 | 9/2006 | Wu et al. | |
| 7,187,567 B2 | 3/2007 | Westcott | |
| 7,453,246 B2 * | 11/2008 | Qiu et al. | 323/282 |
| 2003/0222627 A1 | 12/2003 | Hwang | |
| 2006/0055387 A1 | 3/2006 | Steele | |
| 2006/0055388 A1 | 3/2006 | Tang et al. | |
| 2006/0055389 A1 | 3/2006 | Rice | |
| 2007/0013356 A1 | 1/2007 | Qiu et al. | |
| 2007/0109825 A1 * | 5/2007 | Qiu et al. | 363/41 |
| 2009/0072807 A1 * | 3/2009 | Qiu et al. | 323/285 |
| 2010/0141225 A1 * | 6/2010 | Isham et al. | 323/282 |

FOREIGN PATENT DOCUMENTS

WO  WO9422208 A1  9/1994

* cited by examiner

*Primary Examiner*—Jeffrey L Sterrett
(74) *Attorney, Agent, or Firm*—Gary R. Stanford (57) ABSTRACT

An adaptive pulse positioning system for a voltage converter including an adjustable ramp generator, a pulse generator circuit, and a sense and adjust circuit. The adjustable ramp generator has an adjust input and provides a periodic ramp voltage having an adjustable magnitude based on an adjust signal provided to the adjust input. The pulse generator circuit receives the ramp voltage and generates a pulse signal with control pulses for controlling the output voltage of the voltage controller based on the ramp voltage. The sense and adjust circuit senses an output load transient and provides the adjust signal to the adjust input of the ramp generator to adaptively shift the pulse signal in time in response to the output load transient without adding pulses to the pulse signal.

20 Claims, 9 Drawing Sheets

ADAPTIVE PWM PULSE POSITIONING FOR FAST TRANSIENT RESPONSE

CROSS-REFERENCE TO RELATED APPLICATIONS

The present application is a Continuation-In-Part of U.S. application Ser. No. 11/383,878 filed May 17, 2006, now allowed and issuing on Nov. 18, 2008 as U.S. Pat. No. 7,453, 246, which itself claimed benefit U.S. Application No. 60/737,523 filed on Nov. 16, 2005, and which claimed benefit of U.S. Provisional Application No. 60/774,459 filed on Feb. 17, 2006, all of which both are herein incorporated by reference for all intents and purposes.

BRIEF DESCRIPTION OF THE DRAWINGS

The benefits, features, and advantages of the present invention will become better understood with regard to the following description, and accompanying drawings where.

DETAILED DESCRIPTION

The following description is presented to enable one of ordinary skill in the art to make and use the present invention as provided within the context of a particular application and its requirements. Various modifications to the preferred embodiment will, however, be apparent to one skilled in the art, and the general principles defined herein may be applied to other embodiments. Therefore, the present invention is not intended to be limited to the particular embodiments shown and described herein, but is to be accorded the widest scope consistent with the principles and novel features herein disclosed.

The load current of modern circuits including the modern central processing unit (CPU) is highly dynamic and changes very quickly from low to high and from high to low. A CPU current transient may occur within 1 microsecond ($\mu$s), for example, which is less than the typical switching period of conventional voltage regulators. The present disclosure describes a DC-DC power regulator with a control loop that has sufficient response time to fast load transitions whenever they occur.

In many conventional pulse-width modulation (PWM) schemes, the compensation output of an error amplifier is typically compared to a fixed ramp signal by a PWM comparator. The PWM comparator generates a PWM signal used to control switching of a DC-DC power regulator. To provide switching noise immunity, a reset-set (R-S) flip-flop is often coupled to the output of the comparator to ensure that there is only one pulse for each switching cycle. In a leading-edge modulation scheme, each PWM pulse is initiated based on the comparator output and terminated synchronous with a clock signal. The leading-edge modulation scheme is good for the load-adding transient event but not always responsive to a load-releasing transient. In a trailing-edge modulation scheme, each PWM pulse is initiated synchronous with a clock signal and terminated based on the comparator output. The trailing-edge modulation scheme is good for the load-releasing transient event but not always responsive to a load-adding transient event. In a conventional dual-edge modulation scheme, the ramp is a triangular waveform so that each PWM pulse begins and ends based on a comparison of the triangular waveform with the compensation signal. The conventional dual-edge modulation scheme, however, also exhibits turn-on or turn-off delays since the ramp is fixed and since the leading-edge of the PWM pulse occurs only in the first half cycle while the trailing-edge only occurs in the second half cycle. Each of these conventional schemes, therefore, insert clock signal delays under certain load varying situations.

Figure 1:
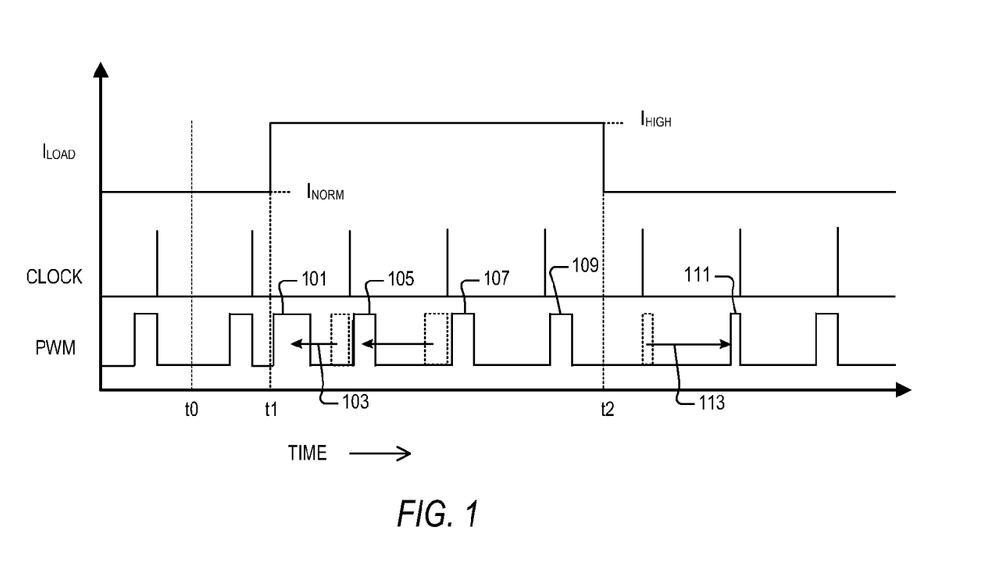
FIG. 1 is a timing diagram illustrating an operation mode of an adaptive PWM pulse positioning scheme according to an embodiment of the present invention.

FIG. 1 is a timing diagram illustrating an operation mode of an adaptive PWM pulse positioning scheme according to an embodiment of the present invention. In FIG. 1, an output load current $I_{LOAD}$ of a DC-DC power regulator (not shown) is plotted versus a clock signal and a PWM signal. At an initial time t0, the $I_{LOAD}$ signal is at a normal level $I_{NORM}$. The clock signal generates a periodic clock pulse according to a predetermined clock frequency. During normal operation under normal load as indicated by the $I_{NORM}$ level of the $I_{LOAD}$ signal, each PWM pulse begins during each clock cycle and is terminated by a pulse on the clock signal. At a subsequent time t1, an output transient occurs as indicated by the $I_{LOAD}$ signal jumping to a new high current level indicated as $I_{HIGH}$. In response to the output load transient, the next pulse 101 of the PWM signal is repositioned towards the beginning of the current clock cycle as indicated by arrow 103 relative to its normal position indicated with dotted lines. By moving the pulse 101 towards the beginning of the cycle after applying heavy load, the blank period after the transient event is naturally shortened, resulting in no extra voltage drop after the initial transient response. In this case, the pulse 101 also has a longer duration in response to the increase in the output load. The subsequent pulses 105, 107 and 109 of the PWM signal during the increased load event (while $I_{LOAD}$ is at $I_{HIGH}$) are shifted towards the beginning of respective clock cycles.

At subsequent time t2, the $I_{LOAD}$ signal returns to the normal level $I_{NORM}$. The next pulse 111 of the PWM signal is shifted back to the normal position at the end of the clock cycle as indicated by arrow 113. In certain modulation schemes as indicated in FIG. 1, the PWM pulse usually occurs at the end of the cycle. Under the transient event, the PWM pulse is pulled ahead in response to the output voltage drop. After the transient event, the PWM pulse goes back to its normal position (e.g., the end of the cycle). In order to avoid the extra voltage drop due to the blank period, the PWM pulse is moved towards the beginning of the cycle under the heavy load. The PWM pulse is at the end of the cycle under light load, therefore, and it moves according to the load condition such as towards the beginning of the cycle under full load condition. The PWM pulse position is flexible for better performance.

Rather than re-positioning the pulse, it is possible to allow a second PWM pulse in the same cycle, which causes the output to settle down sooner. A second pulse in the same cycle, however, tends to increase the switching frequency and thermal dissipation on the power stage if the transient event happens at a high repetitious rate. For fast transient response, it is desired that the PWM pulse be pulled ahead in one or more cycles. It is better to keep the PWM pulse near the end of the cycle under light load, so there is sufficient space to pull the pulse ahead in response to load transient events. The PWM pulse can be placed anywhere within a switching cycle under heavy load. For a load release event, the PWM ends soon after the transient and some blank time is necessary to discharge inductor current. So it is desirable to let the PWM pulse occur at the beginning of the cycle under heavy load condition. Therefore the PWM pulse is kept at the end of the cycle under light load condition, and moved to the beginning of the cycle when the load increases.

Figure 2:
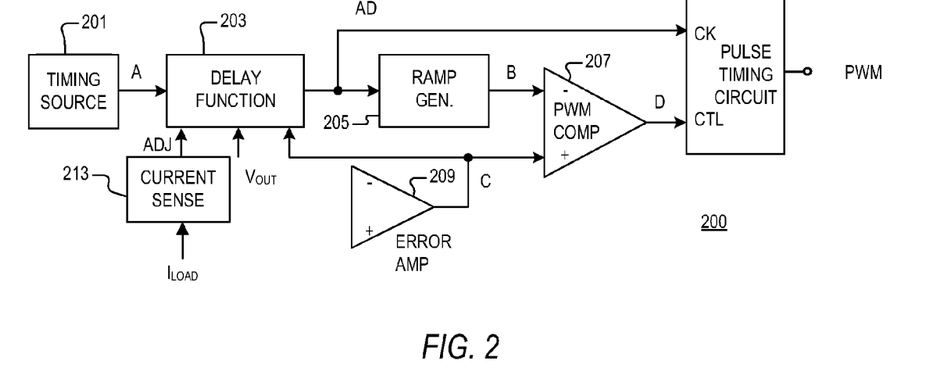
FIG. 2 is a simplified block diagram of a trailing edge modulator circuit implemented according to an embodiment of the present invention.

FIG. 2 is a simplified block diagram of a trailing edge modulator circuit 200 implemented according to an embodiment of the present invention. A timing source 201 generates a clock signal A which is provided to the input of a delay function 203. The delay function 203 delays the A signal and provides a delayed clock signal AD to the input of a ramp generator 205 and to a clock (CK) input of pulse timing circuit 211. In an alternative embodiment, the pulse timing circuit is replaced by an SR flip-flop. The ramp generator 205 generates a ramp signal B, which is provided to one input (e.g., inverting input) of a PWM comparator 207. An error amplifier 209 provides a compensation signal C to the other input (e.g., non-inverting input) of the comparator 207. The comparator 207 generates a signal D, which is provided to a control (CTL) input of the pulse timing circuit 211. The pulse timing circuit 211 generates a PWM signal based on the D signal used to control the output voltage of the DC-DC power regulator, and is configured to ensure only one pulse per cycle of the AD signal. A current sense block 213 provides an adjust signal ADJ to another input of the delay function 203. The current sense block 213 senses output current, such as the load current $I_{LOAD}$ through an output load (as shown) and controls the ADJ signal accordingly. The C signal and the output voltage of the converter $V_{OUT}$ are also shown provided to the delay function 203. The amount of delay between the signals A and AD, or $T_{DELAY}$, is a function of ADJ, $V_{OUT}$ and C, or $T_{DELAY}=TD1+f1*ADJ+f2*C+f3*V_{OUT}$, where TD1 is a constant, and the functions f1, f2 and f3 are any suitable functions that range from relatively simple to as complex as desired. In one embodiment, f1-f3 are constants.

In an alternative embodiment, the current sense block 213 senses current through an output inductor of the regulator, or senses the phase current of each of one or more output phase circuits.

Figure 3:
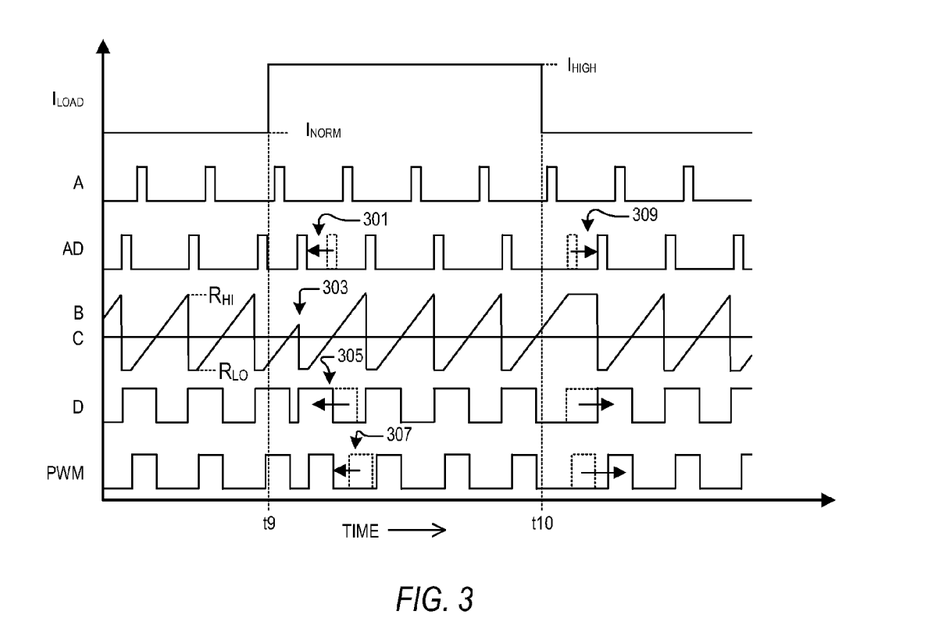
FIG. 3 is a timing diagram illustrating operation of the trailing edge modulator circuit of FIG. 2.

FIG. 3 is a timing diagram illustrating operation of the trailing edge modulator circuit 200. The signals $I_{LOAD}$, A, AD, B, C, D, and PWM are plotted versus time. The B and C signals are superimposed with each other to more clearly illustrate the function of the comparator 207. In the illustrated embodiment, the ramp generator 205 generates the B signal as a sawtooth waveform with rising ramps. Thus, the ramp signal B begins at a low ramp level $R_{LO}$ when the AD signal pulses high and rises at a constant rate when the AD pulse goes back low. The ramp signal B is constrained to a predetermined high level $R_{HI}$ in the illustrated embodiment. The compensation signal C is configured to range between $R_{LO}$ and $R_{HI}$. In operation, the B ramp signal resets back to $R_{LO}$ upon the initial edge of the AD clock signal and ramps up beginning with the trailing edge of the AD clock signal. The comparator 207 asserts the D signal high while B is lower than C, and otherwise asserts the D signal low. The pulse timing circuit 211 generally asserts the PWM signal coincident with the D signal except beginning after the AD signal goes low in each cycle, so that PWM goes high when AD goes low and goes low when D goes low. Operation repeats in this manner and the duration of each PWM pulse depends in part on the level of the compensation signal C.

In a conventional trailing edge modulator circuit (not shown), the delay function 203 is not present so that timing is based on the A clock signal rather than the AD clock signal. The delay function 203 enables the timing of the AD clock signal to be adjusted based on the ADJ signal from the current sense block 213, which modifies the ADJ signal based on the level of the $I_{LOAD}$ signal (or other sensed output current). At a time t9, the $I_{LOAD}$ signal jumps from $I_{NORM}$ to $I_{HIGH}$ as previously described. In response, the current sense block 213 modifies the ADJ signal to decrease the delay of the AD signal relative to the clock signal A. As shown at 301, the next pulse on the AD signal is shifted or re-positioned to earlier in the cycle. The early initial edge of the AD pulse causes the ramp signal B to reset back to $R_{LO}$ earlier than normal as shown at 303. The early reset of the ramp signal B causes the D signal to shift position to earlier in the cycle as shown at 305. The early pulse on the D signal causes the PWM signal to be shifted to be asserted earlier in the cycle as shown at 307. After the load transient shift event, timing of the pulses are effectively the same except that they are shifted relative to the normally condition. The relative widths of the PWM pulses may adjust to handle the additional load. In this manner, the PWM signal is repositioned to earlier in the cycle in response to the load transient event. The PWM signal remains shifted as long as the load transient condition exists, and returns to normal when the higher load condition is removed. As shown at time t10, the $I_{LOAD}$ signal returns to $I_{NORM}$, and the next AD pulse shifts to later in the cycle as shown at 309. This causes the D and the PWM pulses to shift back to their normal positions. In this manner, the positions of the PWM pulses are adjusted or adapted in response to the load transient to provide better performance.

The delay function 203 does not increase the frequency of the clock signal but instead simply enables a temporary adjustment of the positioning of the PWM pulses. It is noted that the delay during normal conditions may be made as long as desired, such as one period of the A signal. If the delay is about equal to the clock period, then the PWM pulse may be repositioned to almost anywhere within a given cycle to properly respond to an asynchronous load transient event.

Figure 4:
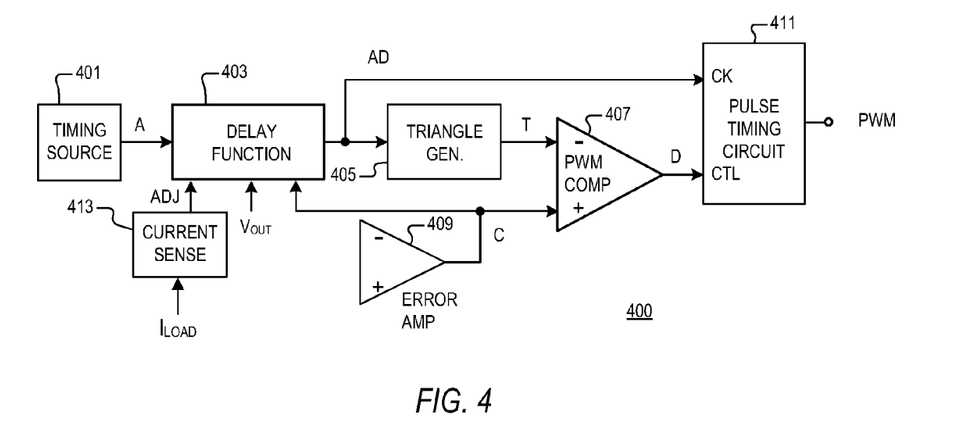
FIG. 4 is a simplified block diagram of a dual edge modulator circuit implemented according to an embodiment of the present invention.

FIG. 4 is a simplified block diagram of a dual edge modulator circuit 400 implemented according to an embodiment of the present invention. In a similar manner as with the trailing edge modulator circuit 200, a timing source 401 generates a clock signal A which is provided to the input of a delay function 403. The delay function may operate in substantially the same manner as the delay function 205. The delay function 403 delays the A signal and provides a delayed clock signal AD to the input of a triangle ramp generator 405 and to a clock (CK) input of pulse timing circuit 411. The triangle ramp generator 405 generates a triangle ramp signal T, which is provided to one input (e.g., inverting input) of a comparator 407. An error amplifier 409 provides a compensation signal C to the other input (e.g., non-inverting input) of the comparator 407 and to the delay function 403. The comparator 407 generates a signal D, which is provided to a control input of the pulse timing circuit 411. The pulse timing circuit 411 generates a PWM signal based on the D signal used to control the output voltage, and is configured to ensure only one pulse per clock cycle. A current sense circuit 413 receives the $I_{LOAD}$ signal and provides an adjust signal ADJ to another input of the delay function 403, which also receives the $V_{OUT}$ signal as shown. The current sense circuit 413 senses output current, such as the load current through an output load or the current through an output inductor or the phase current of each of one or more output phase circuits, and controls the ADJ signal accordingly as previously described. The $V_{OUT}$ signal is also shown provided to the delay function 403. The amount of delay provided by the delay function 403 is substantially similar to the delay function 203, or $T_{DELAY}=TD1+f1*ADJ+f2*C+f3*V_{OUT}$.

Figure 5:
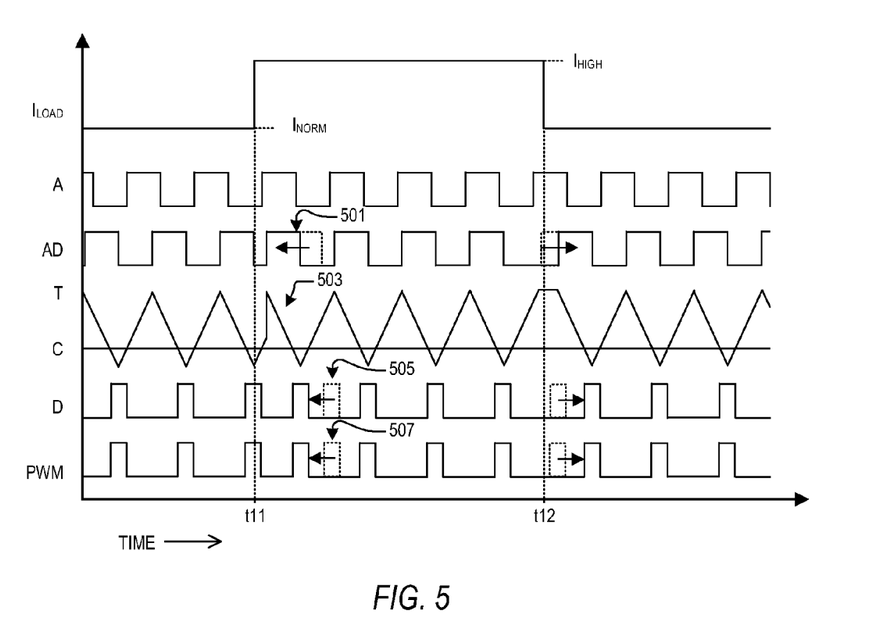
FIG. 5 is a timing diagram illustrating operation of the dual edge modulator circuit of FIG. 4.

FIG. 5 is a timing diagram illustrating operation of the dual edge modulator circuit 400. The signals $I_{LOAD}$, A, AD, T, C, D, and PWM are plotted versus time. The T and C signals are superimposed with each other to more clearly illustrate the function of the comparator 407. In this case, the clock signals A and AD are 50% duty cycle signals. The triangle ramp signal T ramps up while the AD signal is low and ramps down while the AD signal is high. In operation, the D signal is asserted high when the T signal is less than the C signal but is otherwise asserted low. The PWM signal is asserted by the pulse timing circuit 411 while the D signal is high. Operation repeats in this manner and the duration of each PWM pulse depends in part on the level of the compensation signal C.

In a conventional dual edge modulator circuit (not shown), the delay function 403 is not present so that timing is based on the A clock signal rather than the AD clock signal. For the dual edge modulator circuit 400, the delay function 403 enables the timing of the AD clock signal to be adjusted based on the ADJ signal from the current sense block 413, which modifies the ADJ signal based on the level of the $I_{LOAD}$ signal.

At a time t11, the $I_{LOAD}$ signal jumps from $I_{NORM}$ to $I_{HIGH}$ as previously described. The current sense block 413 modifies the ADJ signal in response to decrease the delay of the AD signal relative to the clock signal A. As shown at 501, the AD signal is shifted earlier in the cycle because of the reduced delay. The triangular ramp signal T ramps down earlier (as compared to normal conditions) to intersect the C signal earlier in the clock cycle as shown at 503. The early intersection between the T and C signals causes the D signal to be shifted to be asserted earlier in the cycle as shown at 505, which thus causes the PWM signal to be re-positioned to earlier in the cycle as shown at 507. The adaptive positioning results in the PWM signal being repositioned to earlier in the cycle in response to the load transient event. The PWM pulses remain shifted as long as the load transient condition exists, and return to normal positions when the load condition is removed. As shown as subsequent time t12, the $I_{LOAD}$ signal returns to $I_{NORM}$, causing the AD, D and PWM signals to shift back to their normal positions. In this manner, the position of the PWM pulse is adjusted or adapted and thus flexible for better performance.

A dual-edge modulation scheme using dual ramps was disclosed in U.S. patent application Ser. No. 11/318,081 entitled "PWM controller with dual-edge modulation using dual ramps" filed Dec. 23, 2005, which is herein incorporated by reference for all intents and purposes. The dual-ramp, dual-edge modulation scheme also limits the PWM pulses to one per clock cycle. Due to one pulse per cycle limit, there may exist a period without any PWM pulse after an initial response to a heavy load transient event. This blank period may result in extra voltage drop after the transient event. In one dual-ramp dual-edge modulation scheme, the PWM pulse always happens at the end of the cycle. Under the transient event, the PWM pulse may be pulled ahead in response to the output voltage drop. After the transient event, the PWM pulse goes back to the end of the cycle. In order to avoid the extra voltage drop due to the blank period, the PWM pulse can be moved to the beginning of the cycle under the heavy load. Therefore the PWM pulse is at the end of the cycle under light load, and it moves according to the load condition, and at the beginning of the cycle under full load condition. The PWM pulse position is flexible for better performance.

Figure 6:
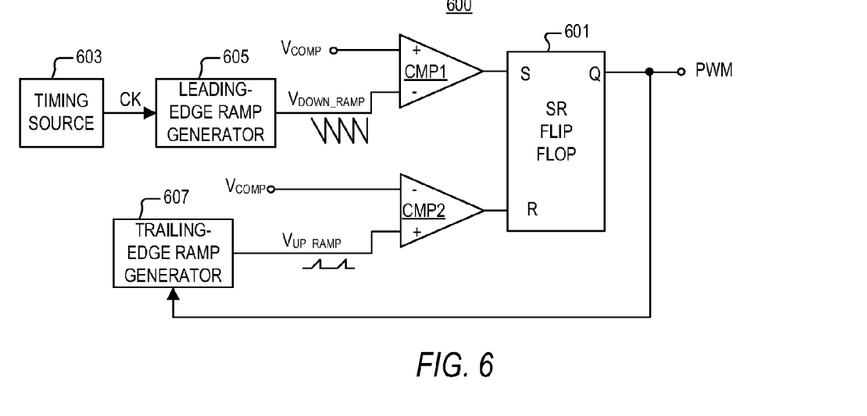
FIG. 6 is a schematic diagram of a dual-ramp dual-edge PWM modulation circuit according to an embodiment described in a previously filed patent application.

FIG. 6 is a schematic diagram of a dual-ramp dual-edge PWM modulation circuit 600 according to an embodiment described in the above-referenced patent application. A down ramp comparator CMP1 has a non-inverting input receiving a compensation signal $V_{COMP}$ (such as from an error amplifier, e.g., 209, 409), an inverting input receiving a down ramp signal $V_{DOWN\_RAMP}$, and an output coupled to the set input of a set-reset (SR) flip-flop 601. An up ramp comparator CMP2 has an inverting input receiving the $V_{COMP}$ signal, a non-inverting input receiving an up ramp signal $V_{UP\_RAMP}$, and an output coupled to the reset input of the SR flip-flop 601. The Q output of the SR flip-flop 601 asserts the PWM signal providing PWM pulses. A timing source 603 generates a clock signal CK, which is provided to a leading-edge ramp generator 605. In the embodiment shown, the leading-edge ramp generator 605 generates the down ramp sawtooth waveform, shown as $V_{DOWN\_RAMP}$, synchronous with the CK signal. When the down ramp signal falls to the level of $V_{COMP}$, the comparator CMP1 asserts its output high and sets the SR flip-flop 601, which asserts the PWM signal high to initiate each PWM pulse. A trailing-edge ramp generator 607 generates a trailing-edge ramp signal for purposes of terminating each PWM pulse, which is shown as the up ramp signal $V_{UP\_RAMP}$. When the PWM signal is asserted high, the trailing-edge ramp generator 607 begins ramping up the $V_{UP\_RAMP}$ RAMP signal (see, e.g., operation of the $V_{UP\_RAMP}$ signal shown in FIG. 16). When $V_{UP\_RAMP}$ RAMP reaches $V_{COMP}$, the comparator CMP2 asserts its output high, resetting the SR flip-flop 601, and pulling the PWM signal low thereby terminating each PWM pulse. When PWM is pulled low, the trailing-edge ramp generator 607 pulls the $V_{UP\_RAMP}$ signal back low again.

The dual-ramp dual-edge PWM modulation circuit 600 turns on and off the PWM pulse at any time within one switching cycle, so its transient response is very quick. Under normal operation, the PWM pulse occurs at the end of the switching cycle. When the heavy load is applied at the beginning of the cycle, the PWM pulse is pulled ahead to the beginning of the switching cycle to try to keep the output within the specifications. In order to limit the switching frequency, typically only one PWM pulse is allowed in one switching cycle. If the heavy transient load event and PWM pulse happens at the beginning of the cycle, another PWM pulse does not occur until next cycle. There may exist a long period in which a PWM pulse does not occur, resulting in extra voltage drop after the initial response.

Figure 7:
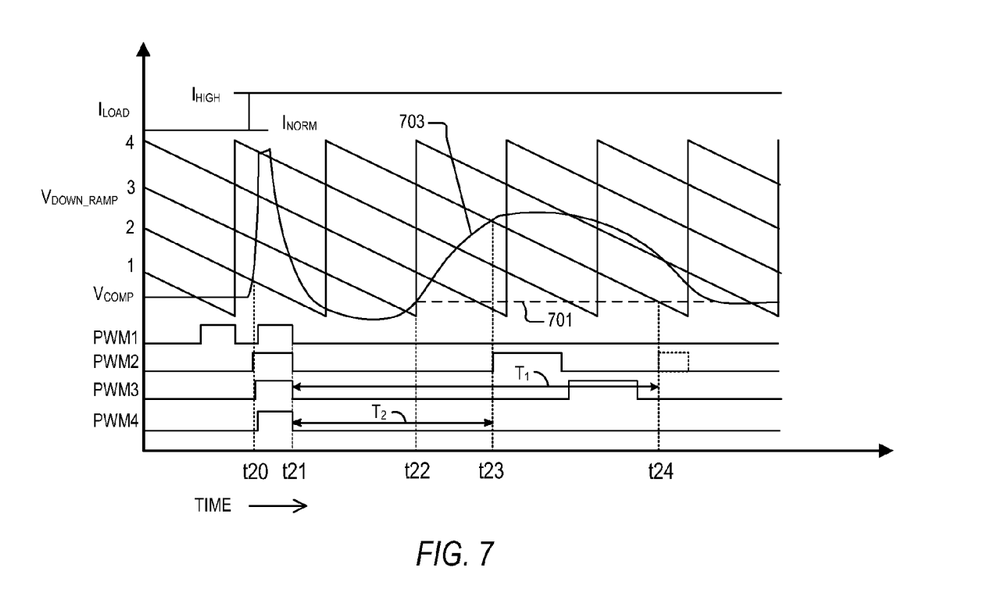
FIG. 7 is a timing diagram illustrating operation of the dual-ramp dual-edge PWM modulation circuit of FIG. 6 illustrating the long blank period issue in the dual-ramp dual-edge modulation scheme for a 4-phase system.

FIG. 7 is a timing diagram illustrating operation of the dual-ramp dual-edge PWM modulation circuit 600 illustrating the long blank period issue in the dual-ramp dual-edge modulation scheme for a 4-phase system. Signals $I_{LOAD}$, four $V_{DOWN\_RAMP}$ signals 1-4 (one for each phase, or $V_{DOWN\_RAMP1}$-$V_{DOWN\_RAMP4}$), the voltage of the compensation signal ($V_{COMP}$) and corresponding four PWM signals PWM1, PWM2, PWM3 and PWM4 are plotted versus time. At about a time t20, a heavy load is applied to the system and the control loop quickly turns on all phases responding to this event as illustrated by simultaneous pulses on each PWM signal. At subsequent time t21, all phases are turned off. At subsequent time t22, the control voltage, $V_{COMP}$, returns to its operational point. In the ideal case, if the system is stable after this time, the control voltage is expected to be constant as indicated by a dashed line 701. Due to the one-pulse-per-cycle limitation, however, there is not another PWM pulse until a time t24. In the ideal case, therefore, there exists a "blank" period $T_1$ between times t21 and t24, which is about equal to the switching period. In an actual case, since no PWM pulse occurs in the blank period, the output voltage drops until next PWM pulse. Therefore the actual compensation voltage $V_{COMP}$ increases as shown at 703 attempting to maintain the output voltage within the specifications. So, there is a PWM pulse earlier in the cycle at a time t23 so that the actual blank period $T_2$ between times t21 and t23 is much less than the switching period. Even though the blank period $T_2$ is less than one switching cycle, it causes the extra voltage drop, and the output voltage may oscillate several cycles before it settles down.

Therefore, in the illustrated dual edge scheme, there may exist a blank period after the initial transient response in the dual-ramp dual-edge modulation scheme, which results in the extra voltage drop and possible oscillation issue. In order to avoid the extra voltage drop, the blank period should be as short as possible. One way to solve the issue is to allow a second pulse in the same cycle under the heavy transient event. As shown in FIG. 7, $V_{COMP}$ goes up again after the initial transient response. If the second PWM pulse is allowed in the same cycle, the output settles down soon. But it may increase the switching frequency and thermal dissipation on the power stage if the transient event happens at a high repetitious rate. For fast transient response, the PWM pulse should be able to be pulled ahead in one cycle. It is better to keep the PWM pulse at the end of the cycle under light load, so there is space to pull the pulse ahead. However, the PWM pulse can be placed anywhere within a switching cycle under heavy load. For a load release event, the PWM ends soon after the transient and some blank time is necessary to discharge the inductor current. So it is desirable to let the PWM pulse occur at the beginning of the cycle under heavy load condition. As described further below, the PWM pulse is kept at the end of the cycle under light load condition, and is moved to the beginning of the cycle when the load increases.

Figure 8:
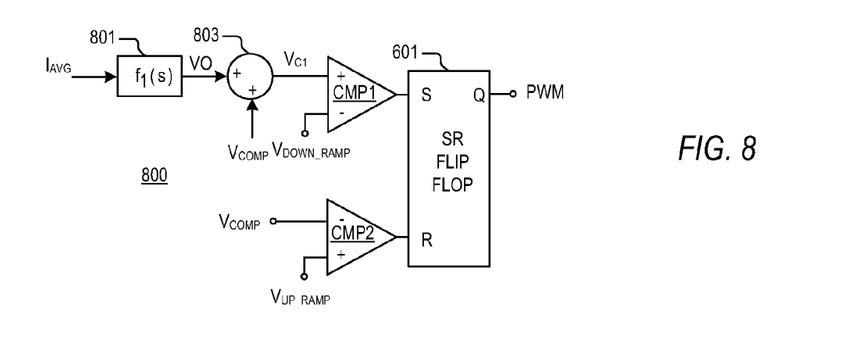
FIG. 8 is a block diagram illustrating an adaptive PWM pulse positioning system according to one embodiment of the present invention applicable to dual-ramp dual-edge PWM modulation circuits.

FIG. 8 is a block diagram illustrating an adaptive PWM pulse positioning system 800 according to one embodiment of the present invention applicable to dual-ramp dual-edge PWM modulation circuits. Similar components as those of the dual-ramp dual-edge PWM modulation circuit 600 assume identical reference characters. The timing source 603 and the generators 605 and 607 are not shown but are provided and operate in the same manner. The up ramp comparator CMP2 receives the $V_{COMP}$ and $V_{UP\_RAMP}$ signals and has its output coupled to the reset input of the SR flip-flop 601. The inverting input of the down ramp comparator CMP1 receives the down ramp signal $V_{DOWN\_RAMP}$ and its output is coupled to the set input of the SR flip-flop 601. In this case, an offset voltage VO is added to the error amplifier output signal $V_{COMP}$ using a function block 801 and an adder 803, which provides an adjusted compensation signal $V_{C1}$ to the non-inverting input of the comparator CMP1. The output of the comparator CMP1 is coupled to the set input of the SR flip-flop 601. The offset voltage VO is a function $f_1(s)$ of the sensed average current $I_{AVG}$ of all phases, such that VO=$f_1(s)$*$I_{AVG}$ in which an asterisk "*" denotes multiplication. Under heavy load, the offset voltage VO is high to trigger the PWM pulse early in the cycle. Although not shown, a balance current may be used to adjust the compensation signal provided to the up ramp comparator CMP2, in which the balance current is related to a sensed phase current of one phase $I_{phase}$ and the sensed average current $I_{AVG}$ of all phases, e.g., $f_2(I_{AVG}, I_{phase})$ where $f_2$ is any suitable function. A simple example is $I_{balance}$=k*($I_{AVG}$-$I_{phase}$), where k is a constant.

Figure 9:
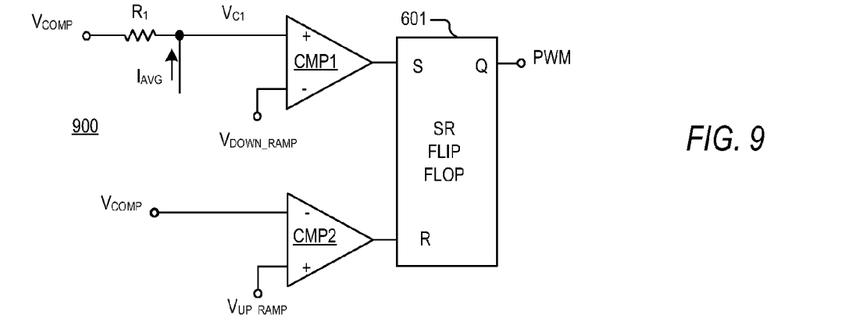
FIG. 9 is a schematic diagram of a PWM pulse positioning system implementing an exemplary embodiment of the adaptive PWM pulse positioning system of FIG. 8.

FIG. 9 is a schematic diagram of a PWM pulse positioning system 900 implementing an exemplary embodiment of the adaptive PWM pulse positioning system 800. Similar components as those of the dual-ramp dual-edge PWM modulation circuit 800 assume identical reference characters. The timing source 603 and the generators 605 and 607 are not shown but are provided and operate in the same manner. In this case, the $V_{COMP}$ signal is provided to one end of a resistor $R_1$, having its other end developing the $V_{C1}$ signal provided to the non-inverting input of the comparator CMP1. The $I_{AVG}$ current is injected into the node developing the $V_{C1}$ signal, so that VO=$R_1$*$I_{AVG}$ and $V_{C1}$=$V_{COMP}$+$R_1$*$I_{AVG}$.

Figure 10:
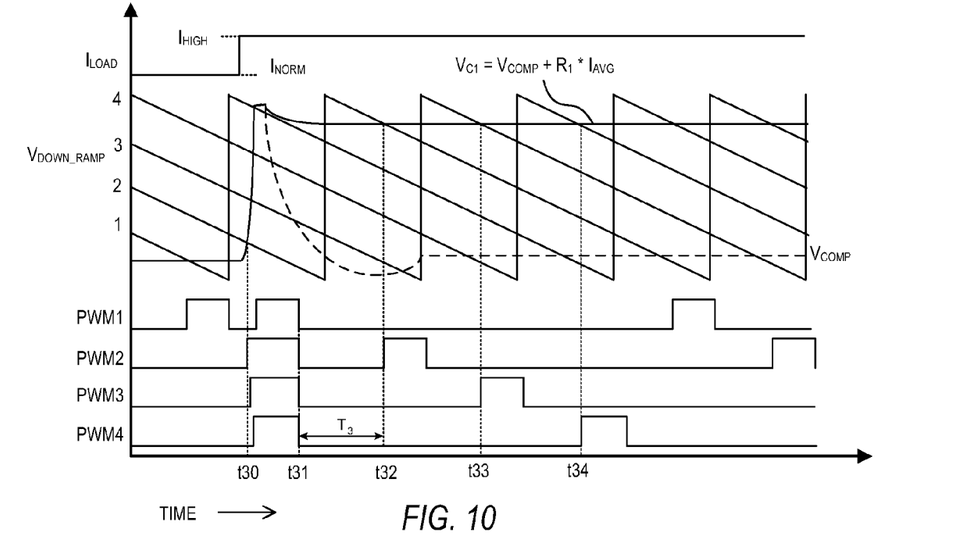
FIG. 10 is a timing diagram illustrating operation of the adaptive PWM pulse positioning system of FIG. 9 for a four phase system.

FIG. 10 is a timing diagram illustrating operation of the adaptive PWM pulse positioning system 900 for a four phase system, which includes four down ramp signals $V_{DOWN\_RAMP1}$-$V_{DOWN\_RAMP4}$ and four PWM signals PWM1-PWM4. The signals $I_{LOAD}$, $V_{C1}$, $V_{DOWN\_RAMP1}$-$V_{DOWN\_RAMP4}$, and PWM1-PWM4 are plotted versus time. The $V_{C1}$ signal is superimposed with the $V_{DOWN\_RAMP1}$-$V_{DOWN\_RAMP4}$ signals to illustrate operation of respective comparators for developing the PWM1-PWM4 signals. The voltage of $V_{COMP}$ is shown with dashed lines for purposes of comparison. As shown, a load transient occurs just before a time t30, causing triggering of all of the PWM1-PWM4 signals, which go low again at about time t31. Additional PWM pulses occur on the PWM2, PWM3 and PWM4 signals at times t32, t33 and t34, respectively, each significantly earlier than would otherwise occur if the $V_{COMP}$ signal was provided directly to the comparator CMP1 rather than the modified compensation signal $V_{C1}$. In this manner, performance is significantly improved.

Figure 11:
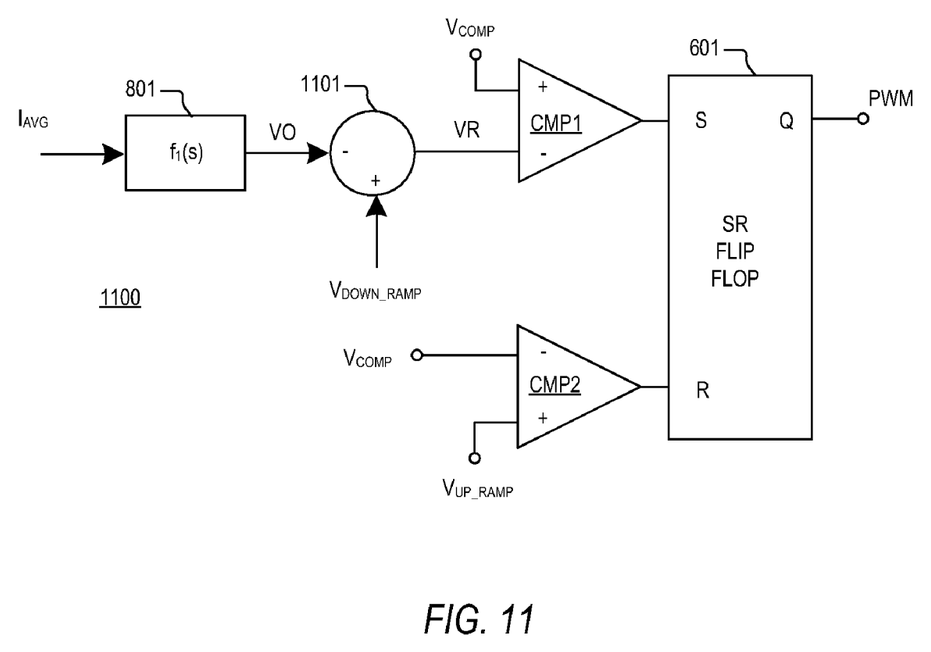
FIG. 11 is a block diagram illustrating an adaptive PWM pulse positioning system according to another embodiment of the present invention applicable to dual-ramp dual-edge PWM modulation circuits.

FIG. 11 is a block diagram illustrating an adaptive PWM pulse positioning system 1100 according to another embodiment of the present invention applicable to dual-ramp dual-edge PWM modulation circuits. The adaptive PWM pulse positioning system 1100 is similar to the adaptive PWM pulse positioning system 800, in which similar components assume identical reference characters. The timing source 603 and the generators 605 and 607 are not shown but are provided and operate in the same manner. The $I_{AVG}$ signal is provided to the function block 801 for developing the offset voltage VO, which is provided to the inverting input of an adder 1101. The adder 1101 receives the $V_{DOWN\_RAMP}$ signal at its non-inverting input. In this case, the $V_{DOWN\_RAMP}$ signal is adjusted by the offset voltage VO rather than the error amplifier output signal $V_{COMP}$. The adder 1101 subtracts VO from $V_{DOWN\_RAMP}$ to develop an adjusted ramp signal VR, which is provided to the inverting input of the comparator CMP1. As shown, the error amplifier output signal $V_{COMP}$ is provided directly to the inverting input of the comparator CMP2, which receives the $V_{UP\_RAMP}$ at its non-inverting input and which has its output coupled to the reset input of the SR flip-flop 601. The SR flip-flop 601 operates in similar manner to provide the PWM signal.

Figure 12:
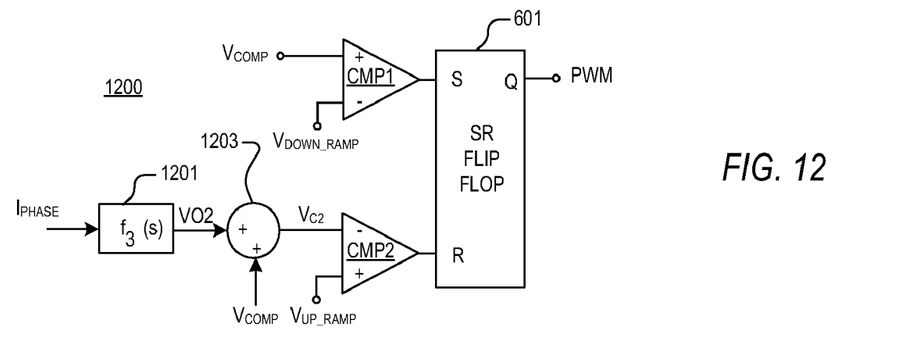
FIG. 12 is a block diagram illustrating an adaptive PWM pulse positioning system according to another embodiment of the present invention applicable to dual-ramp dual-edge PWM modulation circuits.

FIG. 12 is a block diagram illustrating an adaptive PWM pulse positioning system 1200 according to another embodiment of the present invention applicable to dual-ramp dual-edge PWM modulation circuits. The adaptive PWM pulse positioning system 1200 is similar to the dual-ramp dual-edge PWM modulation circuit 600 in which similar components assume identical reference characters. The timing source 603 and the generators 605 and 607 are not shown but are provided and operate in the same manner. The comparator CMP1 is provided and compares the $V_{COMP}$ and $V_{DOWN\_RAMP}$ signals and provides its output to the set input of the SR Flip-Flop 600 providing the PWM signal at its Q output. In this case, a different offset voltage VO2 is developed which is related to the sensed phase current $I_{PHASE}$ of the respective phase of a multiphase converter. The current $I_{PHASE}$ is provided to the input of a function block 1201 (multiplying $I_{PHASE}$ by a function f3(s)) to develop VO2, which is then provided to an input of an adder 1203. The adder 1203 adds $V_{COMP}$ to VO2 develop an adjusted compensation signal VC2. The VC2 signal is provided to the inverting input of the comparator CMP2, which receives $V_{UP\_RAMP}$ at its non-inverting input and which has its output coupled to the reset input of the SR flip-flop 601. Under heavy load, the offset voltage VO2 is high, and the $V_{C2}$ voltage decreases, which causes $V_{COMP}$ to increase to keep the same duty cycle, resulting in early triggering of the PWM pulse for each phase.

Figure 13:
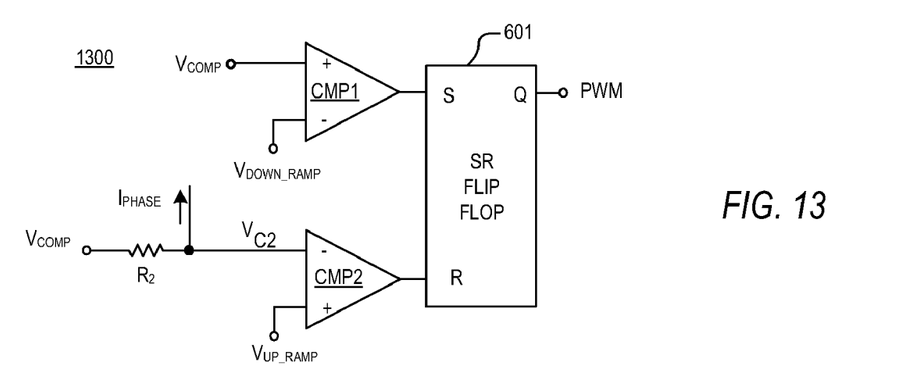
FIG. 13 is a schematic diagram of an adaptive PWM pulse positioning system implementing an exemplary embodiment of the adaptive PWM pulse positioning system of FIG. 12.

FIG. 13 is a schematic diagram of an adaptive PWM pulse positioning system 1300 implementing an exemplary embodiment of the adaptive PWM pulse positioning system 1200. Again, similar components assume identical reference characters. The timing source 603 and the generators 605 and 607 are not shown but are provided and operate in the same manner. In this case, the function block 1201 and the adder 1203 are effectively replaced with a resistor $R_2$, having one end receiving the $V_{COMP}$ signal and another end developing the $V_{C2}$ signal, which is provided to the inverting input of the comparator CMP2 as shown. The $I_{PHASE}$ current is pulled from the node developing the $V_{C2}$ signal, such that $V_{C2}=V_{COMP}-R_2*I_{PHASE}$. The adjusted compensation signal $V_{C2}$ is compared with the $V_{UP\_RAMP}$ signal by the comparator CMP2, which has its output coupled to the reset input of the SR flip-flop 601. The circuit of the comparator CMP1 is the same as that shown in FIG. 12.

Figure 14:
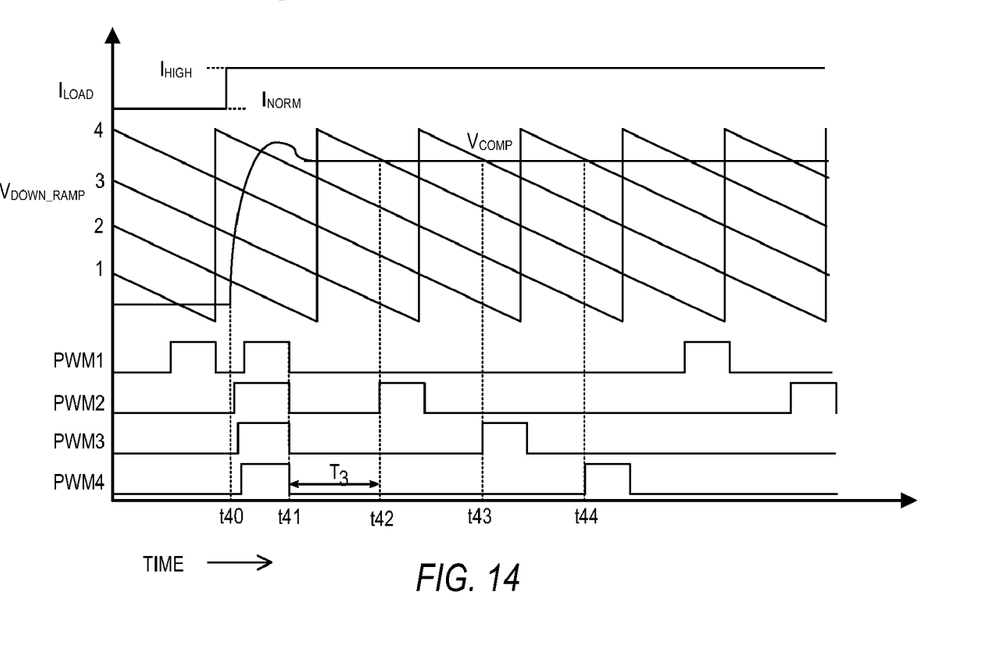
FIG. 14 is a timing diagram illustrating operation of the adaptive PWM pulse positioning system of FIG. 13 for a four phase system.

FIG. 14 is a timing diagram illustrating operation of the adaptive PWM pulse positioning system 1300 for a four phase system, which includes four down ramp signals $V_{DOWN\_RAMP1}$-$V_{DOWN\_RAMP4}$ and four PWM signals PWM1-PWM4. The signals $I_{LOAD}$, $V_{C2}$, $V_{DOWN\_RAMP1}$-$V_{DOWN\_RAMP4}$, and PWM1-PWM4 are plotted versus time. The $V_{COMP}$ signal is superimposed with the $V_{DOWN\_RAMP1}$-$V_{DOWN\_RAMP4}$ signals to illustrate operation of respective comparators for developing the PWM1-PWM4 signals. As shown, a load transient occurs about a time t40, resulting in the increase of the $V_{COMP}$ signal causing triggering of all of the PWM1-PWM4 signals. The PWM1-PWM5 signals go low again at a subsequent time t41. Additional PWM pulses occur on the PWM2, PWM3 and PWM4 signals at times t42, t43 and t44, respectively, each significantly earlier than would otherwise occur if the $V_{COMP}$ signal was provided directly to the comparator CMP2 rather than the modified compensation signal $V_{C2}$. In this manner, performance is significantly improved.

Figure 15:
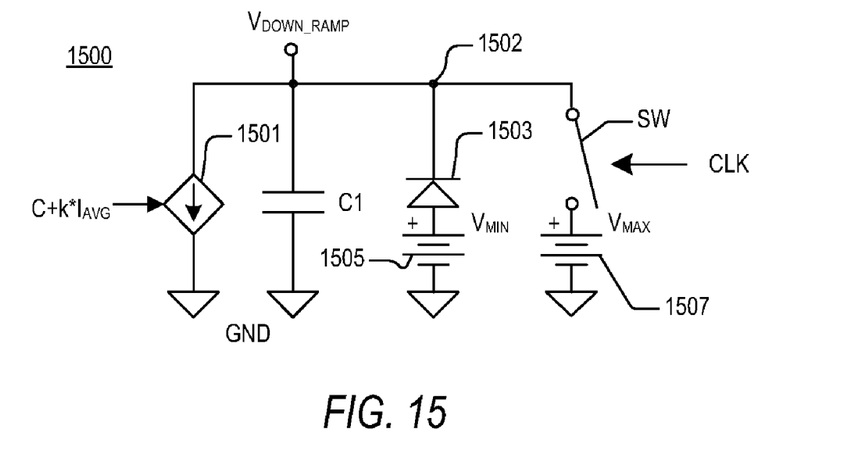
FIG. 15 is a block diagram of a down ramp generator which may be used to develop the down ramp signal of the dual-ramp dual-edge PWM modulation circuit of FIG. 6, thus illustrating an adaptive PWM pulse positioning system according to another embodiment of the present invention.

FIG. 15 is a block diagram of a down ramp generator 1500 which may be used to develop the $V_{DOWN\_RAMP}$ signal of the dual-ramp dual-edge PWM modulation circuit 600, thus illustrating an adaptive PWM pulse positioning system according to another embodiment of the present invention. Thus, the dual-ramp dual-edge PWM modulation circuit 600 is used except that the leading-edge ramp generator 605 is replaced with the down ramp generator 1500. And for the down ramp generator 1500, a controlled current sink 1501 is coupled between ground (GND) and a node 1502 developing the $V_{DOWN\_RAMP}$ signal. A capacitor C1 is coupled between node 1502 and GND. A diode 1503 has its cathode coupled to node 1502 and its anode coupled to the positive terminal of a voltage source 1505 developing a minimum ramp voltage $V_{MIN}$. A single-pole, single-throw (SPST) switch SW has its switched terminals coupled between node 1502 and the positive terminal of a voltage source 1507 developing a maximum ramp voltage $V_{MAX}$, where $V_{MAX}$ is greater than $V_{MIN}$. The negative terminals of the voltage sources 1505 and 1507 are coupled to GND. The switch SW has a control terminal receiving the clock signal (CLK), which opens and closes the SW at the frequency of the CLK signal. The current sink 1501 has a control terminal receiving a signal $C+k*I_{AVG}$, in which C and k are constants. In this manner, the current of the current sink 1501 is based on the measured or sensed level of $I_{AVG}$.

In operation of the down ramp generator 1500, the switch SW closes and the voltage source 1507 charges the capacitor C1 to the voltage level $V_{MAX}$. When the switch SW is opened, the current sink 1501 discharges the capacitor C1 at a rate based on the $I_{AVG}$ signal. The constants C and k are determined to provide a suitable slew rate of the $V_{DOWN\_RAMP}$ signal for a normal operating level of the $I_{AVG}$ signal. When the $I_{AVG}$ signal is increased due to a load transition, the slew rate of the $V_{DOWN\_RAMP}$ signal is increase accordingly to accelerate discharge of the capacitor C1 and thus re-position the next PWM pulse earlier in the cycle. Consequently, the slew rate of the $V_{DOWN\_RAMP}$ signal is adjusted based on the sensed average current $I_{AVG}$. Under light load, $I_{AVG}$ is lower and the slew rate of the $V_{DOWN\_RAMP}$ signal is low. Under heavy load, $I_{AVG}$ is increased and the slew rate of the $V_{DOWN\_RAMP}$ signal is increased, resulting in early triggering of the PWM pulse in the cycle.

Figure 16:
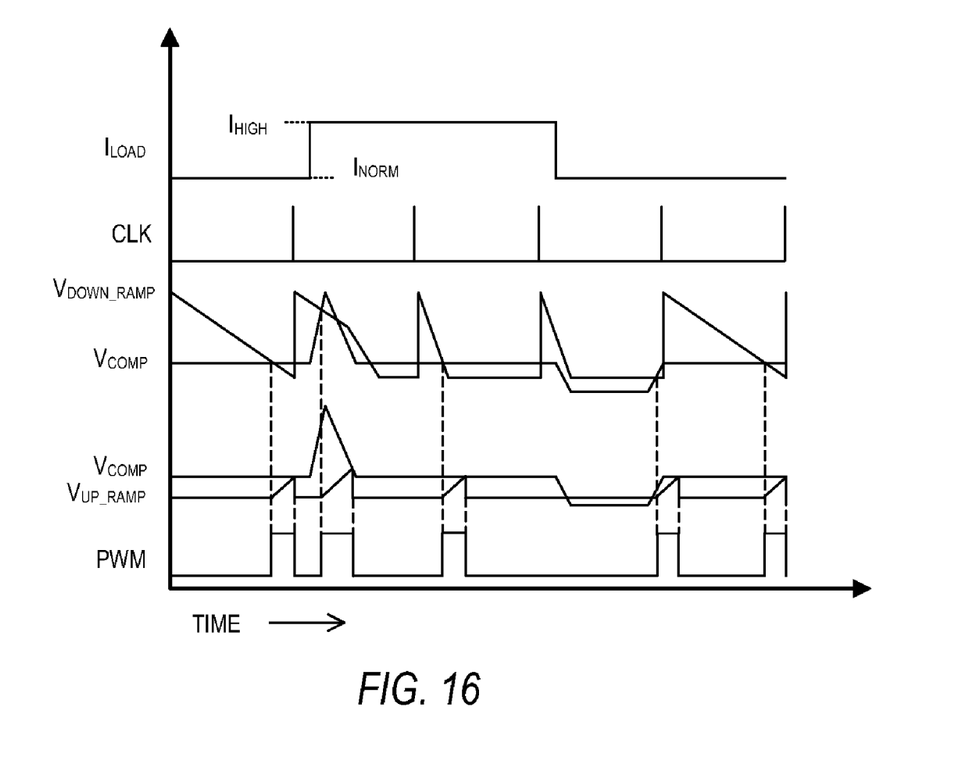
FIG. 16 is a timing diagram illustrating operation of an adaptive PWM pulse positioning system employing the down ramp generator of FIG. 15.

FIG. 16 is a timing diagram illustrating operation of an adaptive PWM pulse positioning system employing the down ramp generator 1500. The $I_{LOAD}$, CLK, $V_{DOWN\_RAMP}$, $V_{UP\_RAMP}$ RAMP, $V_{COMP}$ and PWM signals are plotted versus time. The $V_{COMP}$ signal is superimposed with both the $V_{DOWN\_RAMP}$ and $V_{UP\_RAMP}$ RAMP signals to illustrate operation of the comparators CMP1 and CMP2. When the $I_{LOAD}$ signal jumps from $I_{NORM}$ to $I_{HIGH}$, the $V_{COMP}$ signal temporarily increases and the $I_{AVG}$ signal also increases causing early triggering the PWM signal.

Figure 17:
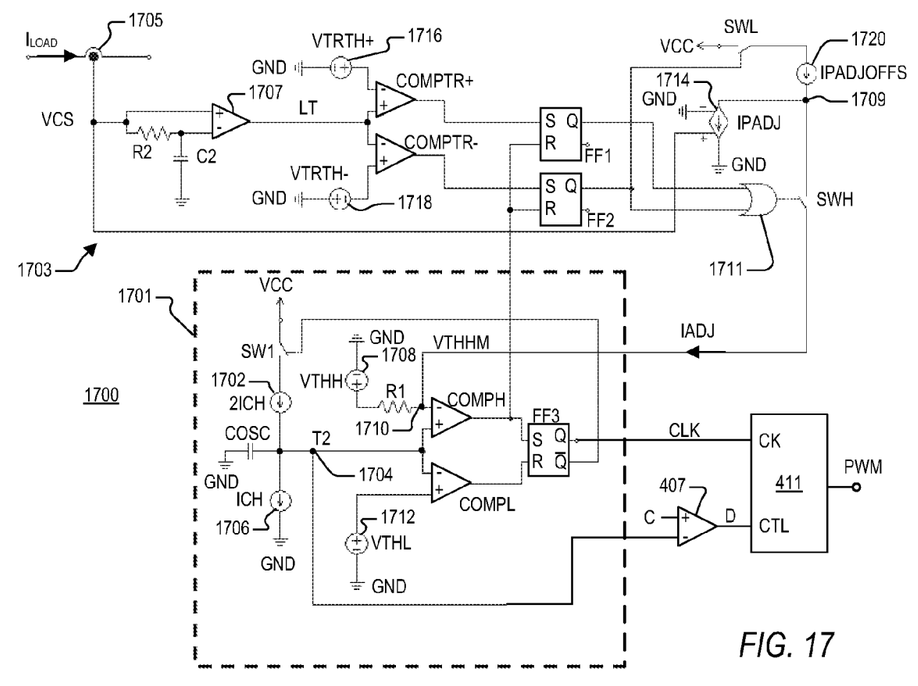
FIG. 17 is a schematic diagram of a dual edge modulator circuit implemented according to another embodiment.

FIG. 17 is a schematic diagram of a dual edge modulator circuit 1700 implemented according to another embodiment. The dual edge modulator circuit 1700 includes a triangle ramp generator 1701 and a sense and adjust circuit 1703. In one embodiment, the dual edge modulator circuit 1700 replaces the functional blocks 401, 403, 405, and 413 of the dual edge modulator circuit 400, where the triangle ramp generator 1701 develops a periodic triangle ramp voltage T2 which replaces the triangle ramp signal T provided to the inverting input of the comparator 407 as shown. The C signal is developed by the error amplifier 409 and provided to the non-inverting input of the comparator 407 in substantially similar manner as previously described. The comparator 407 develops the D signal provided to the CTL input of the pulse timing circuit 411, which generates the PWM signal at its output. The triangle ramp generator 1701 also generates a clock signal CLK provided to the CK input of the pulse timing circuit 411. The pulse timing circuit 411 generates a PWM signal based on the D signal used to control the output voltage of the DC-DC power regulator, and is configured to ensure only one pulse per cycle of the CLK signal. The comparator 407 and the pulse timing circuit 411 collectively form a pulse generator circuit used to generate the PWM pulse signal used to control the output of the voltage regulator. The sense and adjust circuit 1703 senses the $I_{LOAD}$ signal and develops a current modulation signal IADJ used to modulate or otherwise adjust the magnitude of the triangle ramp voltage T2 as further described below. The sense and adjust circuit 1703 essentially replaces the current sense circuit 413 in which the IAJD signal operates as an adjust signal in a similar manner as the ADJ signal, except that the IADJ signal is provided to a node within the triangle ramp generator 1701 to adjust the magnitude of T2 as further described below.

A source voltage VCC is provided to one switched terminal of a normally opened single-pole, single-throw (SPST) switch SW1, having its other switched terminal coupled to a negative terminal of a current source 1702 developing a current 2ICH. The positive terminal of the current source 1702 is coupled to a node 1704 developing the triangle ramp voltage T2. Node 1704 is further coupled to one end of a capacitor COSC, to a negative terminal of another current source 1706 developing a current ICH, to a non-inverting input of a comparator COMPH, to an inverting input of another comparator COMPL, and to the inverting input of the comparator 407. The positive terminal of the current source 1706 and the other end of the capacitor COSC are coupled to GND. A voltage source 1708 has its negative terminal coupled to GND and its positive terminal providing a voltage VTHH to one end of a resistor R1. The other end of the resistor R1 is coupled to a node 1710 which develops a voltage VTHHM and which is coupled to the inverting input of the comparator COMPH. Another voltage source 1712 has its negative terminal coupled to GND and its positive terminal providing a voltage VTHL to the non-inverting input of the comparator COMPL. The output of the comparator COMPH is provided to the set input of an SR flip flop FF3 and the output of the comparator COMPL is provided to the reset input of the SR flip flop FF3. The non-inverting Q output of FF3 develops the CLK signal provided to the CK input of the pulse timing circuit 411. The CLK signal toggles between digital levels with the same frequency as the triangle ramp signal T2. The inverting Q output of FF3 (shown as "Qbar" with a bar drawn over the inverting "Q" output) is provided to the control input of the switch SW1.

The load current $I_{LOAD}$ signal is shown provided through a current sensor 1705 having an output which develops a current sense voltage VCS proportional to $I_{LOAD}$. The $I_{LOAD}$ signal can be the load current itself or some other signal, like the inductor current signal, that is related to or otherwise influenced by the load current. VCS is provided to a non-inverting input of an amplifier 1707, to one input of a resistor R2, and to a positive control input of a voltage-controlled current source 1714 having a negative control input coupled to GND. The current source 1714 has a negative output terminal coupled to a node 1709 and a positive output terminal coupled to GND. The current source 1714 draw a proportional current IPADJ from node 1709 to GND, where the current IPADJ is proportional to VCS which itself is proportional to the level of $I_{LOAD}$. The other end of R2 is coupled to a capacitor C2 and to the inverting input of the amplifier 1702. The other end of the capacitor C2 is coupled to GND and the output of the amplifier 1707 develops a load transient signal LT. LT is provided to the non-inverting input of a comparator COMPTR+ and to the inverting input of another comparator COMPTR−. A voltage source 1716 has its negative terminal coupled to GND and its positive terminal providing a voltage VTRTH+ to the inverting input of the comparator COMPTR+. Another voltage source 1718 has its positive terminal coupled to GND and its negative terminal providing a voltage VTRTH− to the non-inverting input of the comparator COMPTR−. The output of the comparator COMPTR+ is coupled to the set input of an SR flip-flop FF1 and the output of the comparator COMPTR− is coupled to the set input of another SR flip-flop FF2. The output of the comparator COMPH is coupled to the reset inputs of both FF1 and FF2. The non-inverting Q output of FF1 is provided to one input of a two-input OR gate 1711. The non-inverting Q output of FF2 is provided to a control input of a normally-opened SPST switch SWL and to the other input of the OR gate 1711. The switch SWL, which is closed when its control input is logic HIGH, has its switched terminals coupled between VCC and a negative terminal of a current source 1720, which has its positive terminal coupled to node 1709. The current source 1720 provides a current IPADJOFFS to node 1709 when the switch SWL is closed. The output of the OR gate 1711 is coupled to the control input of another normally-opened SPST switch SWH, which has its switch terminals coupled between nodes 1710 and 1709 and which is closed when its control input is logic HIGH. As further described below, the voltage of VTHHM is normally the same voltage level as VTHH. When the switch SWH is closed, a current IAJD, which is shown flowing into node 1710, adjusts the voltage level of VTHHM to modulate the peak value or upper amplitude of T2.

As illustrated further below, the SR flip-flops FF1 and FF2, the current sources 1714 and 1720, the switches SWL and SWH and the OR gate 1711 collectively form an adjust signal generation circuit which controls the IADJ signal to adjust the magnitude of T2 in response to output load transients. In response to a positive load transient causing LT to rise above the positive threshold voltage VTRTH+, the upper threshold voltage of T2 is decreased by an amount proportional to the increase of $I_{LOAD}$. The decrease of the upper threshold voltage of T2 causes the comparator COMPH to trigger earlier which pulls in the next PWM pulse to occur earlier in the cycle. The triggering of COMPH also resets FF1 so that the threshold change is limited to one cycle. In response to a negative load transient causing LT to fall negative below the negative threshold voltage VTRTH−, the upper threshold of T2 is increased by an offset determined by IPADJOFFS and reduced by an amount proportional to the decrease of $I_{LOAD}$. The increase of the upper threshold voltage of T2 causes the comparator COMPH to trigger later which pushes out the next PWM pulse to occur later in the cycle. The triggering of COMPH also resets FF2 so that the threshold change is limited to one cycle.

Figure 18:
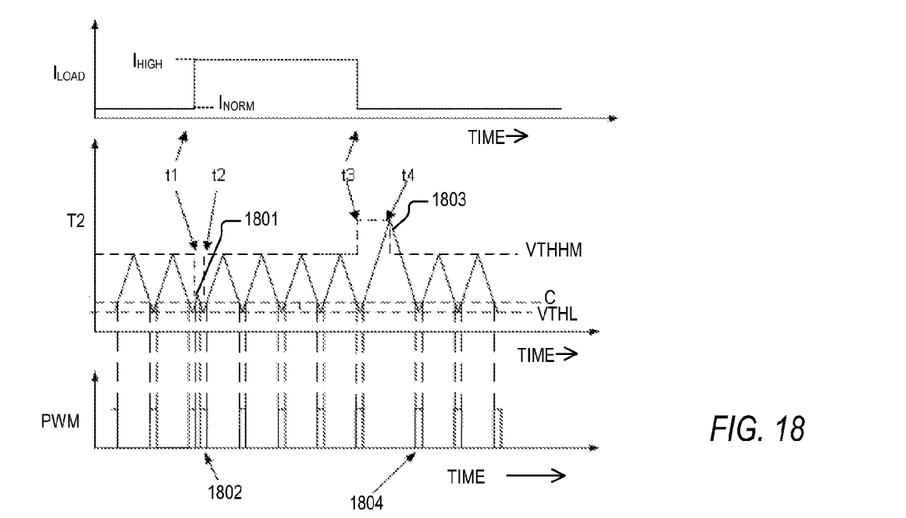
FIG. 18 includes a series of timing diagrams illustrating operation of the dual edge modulator circuit of FIG. 17.

Operation of the dual edge modulator circuit 1700 is described with reference to FIG. 18, which includes a first timing diagram of $I_{LOAD}$ versus time, a second timing diagram of the triangle ramp voltage T2 versus time, and a third timing diagram of the PWM signal versus time. The timing diagram of T2 also illustrates the voltage levels of VTHHM, C and VTHL using dotted lines to illustrate operation of the dual edge modulator circuit 1700. The compensation voltage C is illustrated at a constant level for clarity, where it is understood that the compensation voltage C generally changes with load conditions. Initially the load current $I_{LOAD}$ is at a normal steady state level and the triangle ramp voltage T2 ramps up and down between the threshold voltage levels VTHL and VTHH. When IAJD is zero or negligible, such as during steady-state load conditions, then VTHHM is substantially equal to VTHH. When switch SW1 is opened, the capacitor COSC is discharged by the current ICH so that T2 ramps down from VTHH towards VTHL. When T2 falls to about the voltage level VTHL, the comparator COMPL switches and resets FF3 which closes the switch SW1. The current 2ICH, which is twice the level of ICH, charges the capacitor COSC by current level of about ICH (2ICH−ICH) so that T2 ramps up from VTHL towards VTHH at a constant rate. When T2 reaches the voltage level of VTHH, the comparator COMPH switches and sets FF3 which opens switch SW1. During normal steady-state load conditions or while the output load changes relatively slowly, operation repeats in this manner in which T2 ramps between the threshold voltage levels VTHL and VTHH. During each cycle, when T2 falls below the voltage level of C, the PWM signal is asserted high, and when T2 rises above the voltage level of C, the PWM signal is reset back low.

The resistor R2 and capacitor C2 collectively form a low-pass filter so that the inverting input of the amplifier 1707 is delayed relative to its non-inverting input. In this manner, the magnitude or level of the LT signal changes in response to transitions of VCS which is proportional to $I_{LOAD}$. The voltages VTRTH+ and VTRTH− are threshold voltages which define a voltage range within which the LT voltage may vary without affecting normal operation. Relatively slow changes of $I_{LOAD}$ cause little change of LT. A relatively fast and relatively large change of $I_{LOAD}$, however, causes a corresponding change of VCS so that LT temporarily jumps outside the normal operating range between the threshold voltages VTRTH+ and VTRTH−. In this manner, the amplifier circuit including the amplifier 1707 and the RC filter with R2 and C2 along with the comparator circuits COMPTR+/−form a load transient threshold circuit monitoring output load transients.

At about a time t1, the load current $I_{LOAD}$ jumps quickly to the high current level indicated as $I_{HIGH}$. In response to this output load transient, VCS increases and the amplifier 1707 responds by asserting LT high. In this case, the transition of $I_{LOAD}$ is sufficiently high so that LT rises above the upper threshold voltage VTRTH+ so that the comparator COMPTR+ switches state and sets FF1. The OR gate 1711 asserts its output high in response to the high output of FF1 and closes the switch SWH. The output current IPADJ of the voltage-controlled current source 1714, which is proportional to the relatively high level of $I_{LOAD}$, causes a negative IADJ current to pull current from node 1710 through the resistor R1. The IPADJ current through the resistor R1 lowers the voltage level of VTHHM below the voltage level of VTHH as shown. The relative amount of voltage change of VTHHM depends upon the magnitude of IPADJ, which depends upon the magnitude of VCS and thus of $I_{LOAD}$. When T2 reaches the lowered VTHHM voltage level, the comparator COMPH switches its output high and sets FF3 early to open switch SW1 early in the current PWM cycle. In this manner, T2 reaches a lower magnitude peak early in the cycle and begins ramping back low as shown at 1801. Further, T2 reaches C earlier in the current cycle, which causes the next PWM pulse to adaptively shift to earlier in the cycle shown at 1802 in response to the increased load transient. Standard limiting techniques may be used to limit the movement of the upper threshold to stay above VTHL. The comparator COMPH also resets FF1 at time t2 so that switch SWH is re-opened causing VTHHM to return back to the voltage level of VTHH, and the amplifier 1707 adjusts to the transient and pulls LT back within the threshold voltage range between VTRTH− and VTRTH+. Thus, the sense and adjust circuit 1703 is effectively reset back to normal operation and the triangle ramp voltage T2 and PWM signal return to normal operation to limit the load transient response to a single cycle.

At about a time t3, the load current $I_{LOAD}$ quickly drops back to the normal current level $I_{NORM}$. In response to this negative load transient, the amplifier 1707 asserts LT below the negative threshold voltage VTRTH− causing the comparator COMPTR− to set FF2. It is noted that in the illustrated embodiment VTRTH− is a negative threshold below GND so that LT drops negative and below VTRTH− to trigger the comparator COMPTR−. In response, FF2 closes both switches SWL and SWH. The lower level of $I_{LOAD}$ reduces VCS which reduces the current level of IPADJ. Since both switches SWL and SWH are closed, the current IPADJOFFS is provided to node 1710 offset by the current IPADJ, so that IADJ=IPADJOFFS−IPADJ. The current IADJ is injected into node 1710 through the resistor R1 thereby increasing the voltage of VTHHM as shown at time t3, where the voltage increase is based on the current level of IADJ and the resistance of R1. The rising ramp of the triangle ramp voltage T2 passes the normal upper threshold of VTHH until it reaches the increased voltage of VTHHM at time t4. Since T2 ramps at a constant rate, it takes longer to reach the increased voltage of VTHHM causing a temporary increased magnitude of T2 as shown at 1803. At time t4 when T2 reaches the voltage level of VTHHM, the comparator COMPH switches initiating the negative ramp of T2. T2 eventually falls to the voltage level of C to initiate the next PWM pulse. In this manner, the increased magnitude of T2 delays the next PWM pulse as shown at 1804, and thereafter operation returns to normal until the next load transition. Also at time t4, the comparator COMPH resets FF2 which limits the load transition response to a single cycle.

The dual edge modulator circuit 1700 modulates the amplitude of the ramp signal (triangle or saw-tooth) for a single cycle after a load transient, where the amplitude is lower for one cycle when $I_{LOAD}$ increases, and larger for one cycle when $I_{LOAD}$ decreases. Since the compensation signal C is compared with the ramp signal to generate the PWM pulses, the adaptive change in amplitude shifts the next PWM pulse. Since load transient response is limited to once cycle, subsequent PWM pulses are also shifted in time to maintain the same pulse rate. In general, the pulse signal is adaptively shifted in time without adding pulses. The pulses are pulled in for a positive load transient (increase in load condition) and pushed out for a negative load transient (decrease in load condition). In this manner, the operating frequency is only affected for the once cycle but and returns to normal after each transient. In response to a positive load transient, the next PWM pulse is shifted to occur earlier in time so that operating frequency is momentarily increased. Likewise, in response to a negative load transient, the next PWM pulse is shifted to occur later in time so that operating frequency is momentarily decreased. Since the transient response is limited to one cycle in either case, operating frequency immediately returns to normal so that the change in overall operating frequency is negligible.

The pull-in/push-out action is triggered by a load transient threshold circuit that activates the one cycle threshold change if the load changes more than a predetermined limit. In one embodiment, the predetermined limit is anywhere between 10-50% of full load conditions. The relative shift of the PWM pulse in response to the load transient is adjusted based on the relative magnitude of the transient. For example, the lower the load current during a positive load transient, the lower the level of IPADJ which reduces the drop of VTHHM decreasing the relative shift of the next PWM pulse in response to the load increase. Also, the higher the load current during a negative load transient, the higher the level of the IPADJ current and thus the lower the increase of VTHHM reducing the delay shift of the next PWM pulse. The dual edge modulator circuit 1700 does not miss pulses and expands pulse width automatically if the transient occurs during the PWM's ON-time, which assists load transient response.

Although a dual edge configuration is illustrated, the concept is easily adapted to leading edge or trailing edge modulation systems. Although the load current is sensed indicating output load conditions, other output signals may be sensed such as output voltage or the like. The ramp generator 1701 generates a triangle ramp voltage, although alternative types of ramp signals are contemplated such as sawtooth signals, up ramping signals, down ramping signals, etc. The adjust signal is illustrated as a current signal although any alternative type of signal may be used, such as an adjust voltage or a timing signal and the like.

Although the present invention has been described in considerable detail with reference to certain preferred versions thereof, other versions and variations are possible and contemplated. For example, the delay adjustment of the clock signal or the offset voltage added to the ramp signals and/or the compensation signals may be based on operational parameters other than output or load current, such as input voltage, a differential of output current and/or output voltage (e.g., a transient event or the like), etc. The present invention is also applicable to digital modulators in which the analog functions (e.g., ramps, error signals, compensation signals, etc.) are replaced by digital calculations and/or algorithms and the like. The present invention is applicable to modulators employing digital control, such as used to adjust the delay time, adjusting the clock signal, adjusting timing of PWM pulse activation, adjusting PWM duty cycle based on a calculation result, etc. Those skilled in the art should appreciate that they can readily use the disclosed conception and specific embodiments as a basis for designing or modifying other structures for providing out the same purposes of the present invention without departing from the spirit and scope of the invention.

The invention claimed is:

1. An adaptive pulse positioning system for a voltage converter providing an output voltage, said adaptive pulse positioning circuit comprising:

an adjustable ramp generator having an adjust input and providing a periodic ramp voltage having a magnitude which is adjusted based on said adjust input;

a pulse generator circuit which receives said ramp voltage and which generates a pulse signal comprising a plurality of pulses for controlling the output voltage of the voltage controller based on said ramp voltage; and a sense and adjust circuit which senses a signal indicative of an output load transient of the voltage converter and which provides an adjust signal to said adjust input of said adjustable ramp generator to adaptively shift said pulse signal in time in response to said output load transient without adding pulses to said plurality of pulses.

2. The adaptive pulse positioning system of claim 1, wherein said adjustable ramp generator comprises a triangle ramp generator providing a triangle ramp voltage which ramps between lower and upper threshold voltages, and wherein said adjust input adjusts said upper threshold voltage.

3. The adaptive pulse positioning system of claim 2, wherein said sense and adjust circuit has a reset input coupled to said adjustable ramp generator and wherein said sense and adjust circuit adjusts said upper threshold for only one cycle of said ramp voltage.

4. The adaptive pulse positioning system of claim 1, wherein said pulse generator circuit comprises:

a comparator which compares an error voltage with said ramp voltage and which generates a pulse control signal indicative thereof, and a pulse timing circuit having a first input receiving said pulse control signal, a second input receiving a clock signal based on said ramp voltage, and an output providing said pulse signal, wherein said pulse timing circuit ensures that said pulse signal has only one pulse for each cycle of said ramp voltage.

5. The adaptive pulse positioning system of claim 1, wherein said sense and adjust circuit comprises:

a sensor which senses an output load signal and which provides a sense voltage proportional to said output load signal;

a load transient circuit having an input receiving said sense voltage and an output providing a load transient sense voltage indicative of transients of said output load signal;

a comparator circuit which compares said load transient sense voltage with a positive threshold voltage and a negative threshold voltage, wherein said comparator circuit provides a first control signal if said load transient sense voltage reaches said positive threshold voltage and which provides a second control signal if said load transient sense voltage reaches said negative threshold voltage; and an adjust signal generation circuit which provides said adjust signal to decrease said magnitude of said ramp voltage when said first control signal is provided and which provides said adjust signal to increase said magnitude of said ramp voltage when said second control signal is provided.

6. The adaptive pulse positioning system of claim 5, wherein said sensor comprises a current sensor which senses output load current of the voltage converter.

7. The adaptive pulse positioning system of claim 5, wherein said load transient circuit comprises:

a low-pass filter having an input receiving said sense voltage and having an output; and an amplifier having a first input receiving said sense voltage, a second input coupled to said output of said low-pass filter, and an output providing said load transient sense voltage.

8. The adaptive pulse positioning system of claim 5, wherein said adjustable ramp generator comprises a triangle ramp generator providing a triangle ramp voltage which ramps between lower and upper threshold voltages, and wherein said adjust signal decreases said upper threshold voltage when said first control signal is provided and increases said upper threshold voltage when said second control signal is provided.

9. The adaptive pulse positioning system of claim 8, wherein said adjust signal generation circuit asserts said adjust signal proportional to said sense voltage when said first control signal is provided and asserts said adjust signal at an offset level which is adjusted by an amount proportional to said sense voltage when said second control signal is provided.

10. A method of adaptively positioning pulse width modulation pulses that are used to control an output voltage of a voltage regulator, comprising:
generating a periodic ramp voltage;
comparing the ramp voltage to an error voltage to provide a plurality of pulses in consecutive cycles of the ramp voltage;
sensing a signal indicative of a load transient of an output load of the voltage regulator; and
adjusting the ramp voltage in response to the load transient to adaptively shift the plurality of pulses in time without adding pulses.

11. The method of claim 10, wherein said sensing a signal indicative of a load transient of an output load of the voltage regulator comprises sensing output load current.

12. The method of claim 10, wherein said generating a ramp voltage comprises generating a ramp voltage which ranges between first and second threshold voltages, and wherein said adjusting the ramp voltage comprises adjusting at least one of the first and second threshold voltages for at least one cycle of the ramp voltage.

13. The method of claim 10, wherein said generating a ramp voltage comprises generating a triangle ramp voltage which ramps between a lower threshold voltage and an upper threshold voltage, and wherein said adjusting the ramp voltage comprises adjusting the upper threshold voltage for at least one cycle of the ramp voltage.

14. The method of claim 13, wherein said sensing a signal indicative of a load transient of an output load of the voltage regulator comprises detecting a positive load transient indicating an increased load, and wherein said adjusting the ramp voltage comprises decreasing the upper threshold voltage for at least one cycle of the ramp voltage.

15. The method of claim 13, wherein said sensing a signal indicative of a load transient of an output load of the voltage regulator comprises detecting a negative load transient indicating a decreased load, and wherein said adjusting the ramp voltage comprises increasing the upper threshold voltage for at least one cycle of the ramp voltage.

16. The method of claim 10, wherein said sensing a signal indicative of a load transient of an output load of the voltage regulator comprises:
sensing a change of an output signal;
comparing the change of the output signal with a threshold; and
detecting a load transient when the change of the output signal reaches the threshold.

17. The method of claim 10, wherein said sensing a signal indicative of a load transient of an output load of the voltage regulator comprises:
sensing a change of an output signal;
comparing the change of the output signal with a positive threshold and a negative threshold; and
detecting a load transient when the change of the output signal reaches either one of the positive and negative thresholds.

18. The method of claim 10, wherein said adjusting the ramp voltage comprises adjusting the ramp voltage for only one cycle.

19. The method of claim 10, wherein said adjusting the ramp voltage comprises adjusting the ramp voltage based on relative amount of the load transient.

20. The method of claim 10, wherein:
said generating a periodic ramp voltage comprises generating the ramp voltage between a lower threshold voltage and an upper threshold voltage; and
wherein said adjusting the ramp voltage comprises:
decreasing the upper threshold voltage by an amount proportional to the load transient indicating an increased load; and
increasing the upper threshold voltage by an offset minus an amount proportional to the load transient indicating a decreased load.

* * * * *